E. G. HINES.
KITCHEN UTENSIL.
APPLICATION FILED JAN. 9, 1913.
1,109,418.
Patented Sept. 1, 1914.
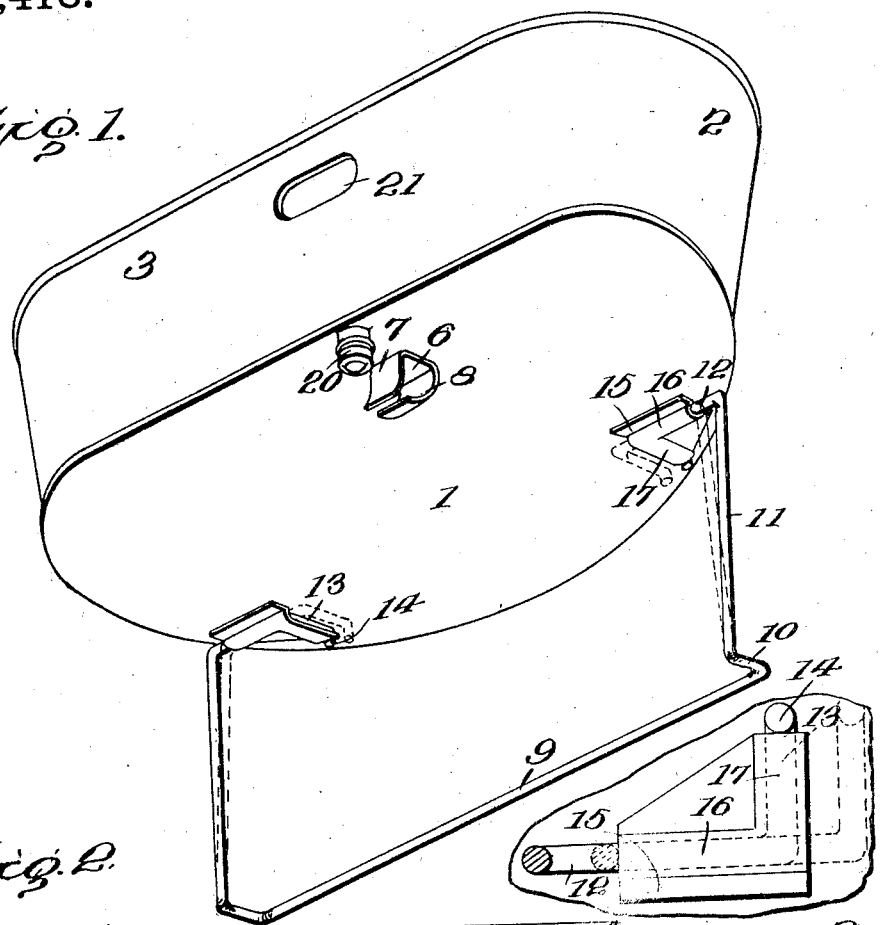
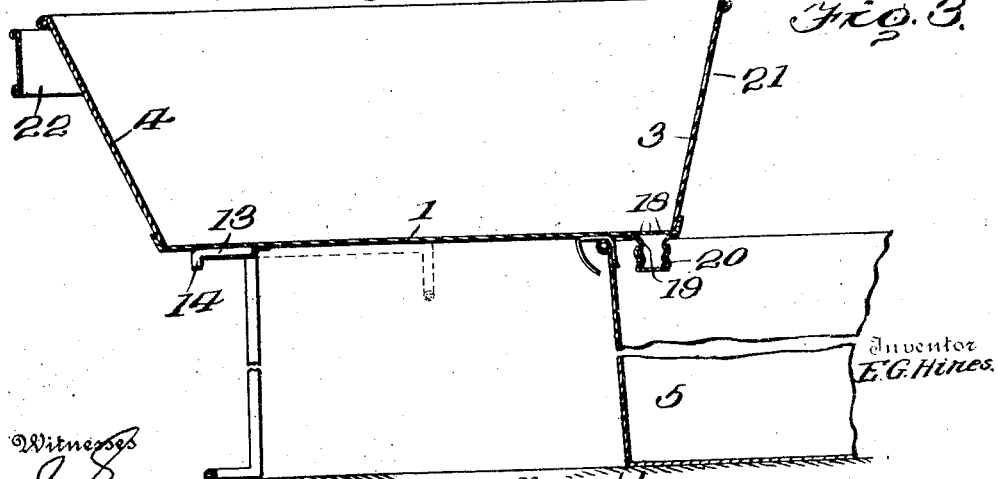
Inventor
E. G. Hines.
Witnesses
By
Attorneys

UNITED STATES PATENT OFFICE.

EDWIN G. HINES, OF DRUMS, PENNSYLVANIA.

KITCHEN UTENSIL.

1,109,418.

Specification of Letters Patent.

Patented Sept. 1, 1914.

Application filed January 9, 1913. Serial No. 741,027.

*To all whom it may concern:*

Be it known that I, EDWIN G. HINES, citizen of the United States, residing at Drums, in the county of Luzerne and State of Pennsylvania, have invented certain new and useful Improvements in Kitchen Utensils, of which the following is a specification.

This invention relates to kitchen utensils, and has as its object to provide a utensil which may be employed as a dish drainer, as a berry washer and, when not in use for either of these purposes, as a rack for tea towels.

One aim of the invention is to so construct the utensil that when in use as a dish drainer, water draining from the dishes placed thereon will be permitted to flow from the utensil back into the dish-pan and will not be allowed to collect in the bottom of the utensil.

Another aim of the invention is to so construct the utensil that when employed as a berry washer it will automatically separate from the good berries, bits of straw and berries of inferior quality, it being only necessary to direct a stream of water into the utensil after the berries have been placed therein.

The invention has a further aim to provide, as a support for the utensil, an assemblage of elements adapted to serve as a rack for a tea towel, or the like, when the utensil is not in use as a drainer, or as a berry washer.

For a full understanding of the invention reference is to be had to the following description and accompanying drawing in which :—

Figure 1 is a perspective view of the utensil embodying the present invention. Fig. 2 is a vertical transverse sectional view therethrough, the utensil being in position for use either as a dish drainer or berry washer. Fig. 3 is a plan view illustrating in detail a portion of the supporting device for the utensil.

Corresponding and like parts are referred to in the following description and indicated in all the views of the accompanying drawing by the same reference characters.

In the drawing the utensil is illustrated as consisting in part of a pan, the bottom of which is indicated by the numeral 1 and the wall by the numeral 2. The wall 2 at the front of the pan is approximately straight, as indicated at 3 and at the rear and at the ends thereof is curved and inclined, as indicated at 4. In order that the pan may be readily engaged with the side of a dish-pan, indicated in Fig. 2 by the numeral 5, a clip is provided upon the under side of the bottom 1 and includes an attaching portion 6 and fingers 7 and 8 which project downwardly from the attaching portion and are located respectively, one behind the other. The finger 7 is extended substantially vertically, whereas the finger 8 is curved to extend downwardly and forwardly, as clearly shown in Fig. 2. The bead usually found at the upper edge of the wall of an ordinary dish pan is to be received between the fingers 7 and 8, in a manner shown in the said Fig. 2, and while the clip may be readily engaged with and disengaged from the bead and edge of the pan, when the pan is in use, it will be securely held against accidental disengagement.

It will be observed that the clip 6 is located at the forward side of the bottom 1 and consequently some means must be provided for supporting the pan at its rear side and such means will now be described. The support above mentioned, is formed from a length of wire which is preferably resilient and which is bent to form a connecting or intermediate portion 9 and at the ends of the said portion is bent rearwardly at right angles as at 10 and thence upwardly at right angles to form supporting legs 11, the intermediate portion 9 and the portions 10 constituting a foot common to both of the said legs. The legs 11 at their upper ends are bent laterally at right angles and in a direction toward each other as at 12 and thence rearwardly at right angles to their portions 12 as at 13, the extremities of the portions 13 being bent downwardly as at 14. The portions 12 of the supporting member constitute pintles upon which the member may swing, as will now be explained. Approximately triangular plates 15 are soldered or otherwise secured upon the under side of the bottom 1 of the pan in spaced relation with respect to each other and at points adjacent the rear side of the pan, and each of these plates is stamped to form a sleeve 16 which opposes the under face of the bottom and which hingedly receives the pintle portion 12 of the respective leg 11. Each plate 15 is also stamped to form a socket 17 which extends at right angles to the sleeve 16 and has an open side presented toward that side of the pan opposite the side at which the plate 15 is located.

It will be apparent from the foregoing and from inspection of the several figures of the drawing that the portions 12 may pivot in the sleeves 16 so that the supporting member may be swung to position to support the pan, as shown in Figs. 1 and 2, or may be swung to lie beneath the bottom of the pan, as illustrated in dotted lines in the said Fig. 2. As before stated, the members are preferably formed from resilient wire and the legs 11 thereof have a tendency to spread or move away from each other. As a consequence, when the member is in supporting position, the portions 13 of the member will be held yieldably in engagement in the sockets 17 and the member will be held against being accidentally swung to position beneath the bottom 1. When it is so desired to swing the supporting member, the legs 11 at their upper ends are pressed toward each other so as to disengage the portions 13 from the sockets 17 and permit of the swinging movement of the said member.

In order that water draining from the dishes disposed within the pan may return to the dish-pan, the bottom of the pan is formed with a number of drain openings 18 and upon its under side is provided with a depending drain spout 19 with which all of the openings 18 communicate. A cap 20 is removably threaded upon the spout 19 and when removed will allow the water within the pan to drain through the opening 18. It will be observed that the spout 19 is located in advance of the clip 6 so that when the clip is engaged with the rim of the dish-pan, in the manner shown in Fig. 2, the spout will be located inwardly of the rim and in position to discharge the drain water.

In order that the utensil may be employed as a berry washer, it is formed in its forward wall 3 with an opening 21, located preferably near the upper edge of the said wall. When the utensil is to be employed for the purpose stated, the cap 20 is applied to the spout 19 and the berries to be washed are deposited within the pan. Water is then poured onto the berries and as its level rises in the pan, any bits of straw or leaves, or any inferior berries mixed with the good berries, will rise to the surface of the water within the pan and as the water overflows through the opening 21 these bits of straw, etc., will be carried out by the overflowing water. As a consequence, it is only necessary to direct a stream of water into the pan in order to quickly and thoroughly separate from the good berries any particles of foreign matter and any berries of inferior quality which, as is well-known will float in water.

At the rear side of its wall 2, the pan is provided with a handle 22 which may be grasped for the purpose of carrying the pan from place to place and which serves as a means whereby the pan may be hung upon a nail driven in a wall, or any like support. When the pan is not in use and is hung upon a nail or hook, the supporting member above described may be swung down to position against the bottom 1, as shown in dotted lines in Fig. 2, but if it is desired to dry a tea-towel, or similar cloth, the supporting member may be held in the position shown in full lines in Figs. 1 and 2, and the cloth or towel may be draped over the intermediate portion 9 thereof.

It will be apparent that when the drainer is to be used in connection with a dish-pan disposed upon a table or bench, the supporting member 9 may be swung downwardly to perform its supporting function. However, if the dish-pan is disposed within a sink and the drainer is disposed upon a drain board, shelf, table, or the like, located beside the sink, the supporting member will be swung up to position beneath the bottom of the drainer. Furthermore, when the device is to be used as a berry washer, the supporting member may be swung up to the last mentioned position and its foot 9 and the ends of its portions 13 will then rest upon the surface upon which the device is disposed.

Having thus described the invention what is claimed as new is:—

1. In a device of the class described, a receptacle having an outlet, attaching means located at one side of the receptacle, and a support located in the other side of the receptacle, the support including spaced legs and a connecting foot, the legs having laterally extending portions hingedly connected with the bottom of the receptacle and having portions extending from the said laterally projecting portions and constituting stops, the said bottom of the receptacle being provided with sockets to receive the stops.

2. In a device of the class described, a receptacle, attaching means at one side of the receptacle, and a support for the receptacle located at the other side thereof and including spaced legs and a connecting foot, the legs having laterally projecting pintle portions hingedly connected with the bottom of the receptacle and having portions projecting from the said pintle portions, the legs having a tendency to spring apart and the bottom of the receptacle being provided with sockets to receive the last mentioned portions of the legs when the supporting member is in extended position and the legs are sprung apart.

3. In a device of the class described, a receptacle, and a supporting member for the receptacle including spaced legs having a tendency toward movement away from each other, the said legs having portions hingedly and slidably connected with the receptacle whereby the legs may be swung to extend from or lie beside the bottom of the receptacle, the receptacle being provided upon its bottom near the hinged end of each leg with a socket arranged to coöperate with the said end of the leg to hold the supporting member in supporting position.

In testimony whereof I affix my signature in presence of two witnesses.

EDWIN G. HINES. [L. S.]

Witnesses:
 JOHN WILHELM,
 MARTIN B. GORMLEY.